US009455998B2

(12) United States Patent
Ivanchykhin et al.

(10) Patent No.: US 9,455,998 B2
(45) Date of Patent: Sep. 27, 2016

(54) SYSTEMS, METHODS AND APPARATUSES FOR PREVENTION OF RELAY ATTACKS

(71) Applicant: OLogN Technologies AG, Triesen/FL (LI)

(72) Inventors: Dmytro Ivanchykhin, Kiev (UA); Sergey Ignatchenko, Innsbruck (AT)

(73) Assignee: OLogN Technologies AG, Triesen/FL (LI)

( * ) Notice: Subject to any disclaimer, the term of this patent is extended or adjusted under 35 U.S.C. 154(b) by 0 days.

(21) Appl. No.: 14/487,778

(22) Filed: Sep. 16, 2014

(65) Prior Publication Data

US 2015/0082427 A1   Mar. 19, 2015

Related U.S. Application Data

(60) Provisional application No. 61/878,938, filed on Sep. 17, 2013.

(51) Int. Cl.
| | |
|---|---|
| *H04L 29/06* | (2006.01) |
| *H04B 5/00* | (2006.01) |
| *G06Q 20/40* | (2012.01) |
| *H04W 12/06* | (2009.01) |
| *H04W 12/12* | (2009.01) |

(52) U.S. Cl.
CPC ......... *H04L 63/1416* (2013.01); *G06Q 20/401* (2013.01); *H04B 5/0031* (2013.01); *H04L 63/08* (2013.01); *H04W 12/06* (2013.01); *H04W 12/12* (2013.01)

(58) Field of Classification Search
CPC .................................................. H04L 63/1416
USPC ........................................................... 726/22
See application file for complete search history.

(56) References Cited

U.S. PATENT DOCUMENTS

| | | | |
|---|---|---|---|
| 5,673,293 A | 9/1997 | Scarpa et al. | |
| 5,864,624 A | 1/1999 | Lukas et al. | |

(Continued)

FOREIGN PATENT DOCUMENTS

| | | |
|---|---|---|
| EP | 2 071 787 A1 | 6/2009 |
| WO | WO 2007/029863 A1 | 3/2007 |
| WO | WO 2011/131745 A1 | 10/2011 |

OTHER PUBLICATIONS

NPL—by meadows et al. ("Distance bounding protocols: authentication logic analysis and collusion attacks"—Advances in Information Security, vol. 30, 2007).*

(Continued)

*Primary Examiner* — Longbit Chai
(74) *Attorney, Agent, or Firm* — Arnold & Porter LLP

(57) ABSTRACT

The systems, methods and apparatuses described herein provide an apparatus configured for preventing relay attacks on a communication link between the apparatus and a communication partner. The apparatus may comprise a communication port, a timer and a processor. The processor may be configured to generate a request, transmit the request through the communication link using the communication port and start counting time using the timer, receive a response via the communication port and stop the timer, receive authentication data via the communication port, authenticate the authentication data, compare the counted time with a predefined threshold, compare a first field within the request with a second field within the response and determine whether there is a relay attack.

36 Claims, 15 Drawing Sheets

(56) References Cited

U.S. PATENT DOCUMENTS

| | | | |
|---|---|---|---|
| 6,058,121 | A | 5/2000 | Kim et al. |
| 6,853,616 | B1 | 2/2005 | Kim et al. |
| 6,976,168 | B1 | 12/2005 | Branstad et al. |
| 7,886,968 | B2 | 2/2011 | Shoemaker |
| 8,559,339 | B1 | 10/2013 | Talley et al. |
| 2004/0019785 | A1 | 1/2004 | Hawkes et al. |
| 2004/0039946 | A1 | 2/2004 | Smith et al. |
| 2004/0250074 | A1 | 12/2004 | Kilian-Kehr |
| 2005/0273608 | A1 | 12/2005 | Kamperman |
| 2006/0044108 | A1 | 3/2006 | Nowottnick |
| 2006/0248340 | A1 | 11/2006 | Lee et al. |
| 2007/0058559 | A1 | 3/2007 | Xu |
| 2007/0259693 | A1 | 11/2007 | Brunel et al. |
| 2008/0013640 | A1 | 1/2008 | Lu et al. |
| 2008/0157929 | A1 | 7/2008 | Hilgers et al. |
| 2009/0275352 | A1 | 11/2009 | Kim et al. |
| 2010/0008252 | A1 | 1/2010 | Alve |
| 2011/0078549 | A1 | 3/2011 | Thueringer et al. |
| 2011/0170532 | A1 | 7/2011 | Tchepnda et al. |
| 2012/0151210 | A1 | 6/2012 | Perez |
| 2013/0116964 | A1* | 5/2013 | van Roermund .... G06K 7/0008 702/141 |
| 2013/0283361 | A1 | 10/2013 | Rao et al. |
| 2013/0287011 | A1 | 10/2013 | Zhao |
| 2014/0082696 | A1 | 3/2014 | Danev et al. |
| 2014/0214687 | A1 | 7/2014 | Huxham |
| 2014/0282875 | A1 | 9/2014 | Ignatchenko et al. |
| 2014/0282906 | A1 | 9/2014 | Ignatchenko |
| 2014/0282907 | A1 | 9/2014 | Ignatchenko |
| 2014/0282947 | A1 | 9/2014 | Ignatchenko et al. |
| 2014/0304798 | A1 | 10/2014 | Iyengar et al. |
| 2014/0334466 | A1 | 11/2014 | Ignatchenko et al. |
| 2015/0244685 | A1 | 8/2015 | Shah et al. |

OTHER PUBLICATIONS

U.S. Appl. No. 61/623,861, filed Apr. 13, 2012.

U.S. Appl. No. 61/792,996, filed Mar. 15, 2013.

U.S. Appl. No. 61/825,376, filed May 20, 2013.

"Information technology—Identification cards—Integrated circuit(s) cards with contacts—Part 3: Electronic signals and transmission protocols," ISO/IED 7816-3:1997/PDAM-2, ISO/IEC, 16 pgs. (2002).

Anderson, "Security Engineering: A Guide to Building Dependable Distributed Systems," Protocols, Chapter 2, pp. 13-33 (2008) <www.cl.cam.ac.uk/~rja14/Papers/SE-02.pdf>.

Bahr et al., "Minimizing Trilateration Errors in the Presence of Uncertain Landmark Positions," EMCR, pp. 1-6 (2007).

Brands et al., "Distance-Bounding Protocols," Pro. Advances in Cryptology (EUROCRYPT\'93), pp. 344-359 (1994) <http://citeseerx.ist.psu.edu/viewdoc/download?doi=10.1.1.51.6437&rep=rep1&type=pdf.

Čapkun et al., "Secure positioning of wireless devices with application to sensor networks," INFOCOM 2005, $24^{th}$ Annual Joint Conference of the IEEE Computer and Communications Societies, Proceedings IEEE, 3:1917-1928 (2005).

Clulow et al., "So Near and Yet So Far: Distance-Bounding Attacks in Wireless Networks," ESAS' 2006 Proceedings of the Third European Conference on Security and Privacy in Ad-Hoc and Sensor Networks, pp. 83-97 (2006).

Cremers et al., "Distance Hijacking Attacks on Distance Bounding Protocols," ETH Zurich, Institute of Information Security, Switzerland, pp. 1-35 (2012) <http://eprint.iacr.org/2011/129.pdf>.

Francis et al., "Practical Relay Attack on Contactles Transactions by Using NFC Mobile Phones," The 2012 Workshop on RFID and IoT Security (RFIDsec2012 Asia), Editors / Nai-Wei Lo; Yingjiu Li., IOS Press, 8:21-32 (2012).

Hancke et al., "Attacks on Time-of-Flight Distance Bounding Channels," Proceedings of $1^{st}$ ACM Conference on Wireless Network Security, pp. 194-202 (2008).

Hancke et al., "Security of Proximity Identification Systems," Technical Report No. 752, University of Cambridge Computer Laboratory, pp. 1-161 (2009).

International Search Report and Written Opinion mailed Aug. 7, 2014, as received in International Application No. PCT/IB2014/059542.

International Search Report and Written Opinion mailed Aug. 7, 2014, as received in International Application No. PCT/IB2014/061347.

International Search Report and Written Opinion mailed Jan. 8, 2015, as received in International Application No. PCT/IB2014/064606.

International Search Report and Written Opinion mailed Jul. 7, 2014, as received in International Application No. PCT/IB2014/059537.

Jung, "SSL/TLS," CS 686 Special Topics in Computer Science: Privacy and Security, Department of Computer Science, University of San Francisico, pp. 1-18 (2010) <http://www.cs.usfca.edu/~ejung/courses/686/lectures/1OSSL.pdf>.

Man-in-the-middle attack, n.d., Web, Oct. 27, 2015, Wiki: <http://en.wikipedia.org/wiki/Mafia_Fraud_Attack>.

Singelee et al., "Location Verification using Secure Distance Bounding Protocols," Proc. IEEE International Conference Mobile Ad hoc and Sensor Systems, pp. 840-846 (2005).

Thorbjornsen et al., "Radio Frequency (RF) Time-of-Flight Ranging for Wireless Sensor Networks," Meas. Sci. Technol., 21(3):1-22 (2010) <http://eprints.soton.ac.uk/268352/1/rf_time-of-flight_ranging.pdf>.

Yang et al., "Quality of Trilateration: Confidence based Iterative Localization," IEEE Transactions on Parallel and Distributed Systems, 21(5):631-640 (2010).

\* cited by examiner

SYSTEMS, METHODS AND APPARATUSES FOR PREVENTION OF RELAY ATTACKS

RELATED APPLICATIONS

This application claims priority to U.S. Provisional Application No. 61/878,938, filed Sep. 17, 2013, entitled "SYSTEMS, METHODS AND APPARATUSES FOR PREVENTION OF RELAY ATTACKS," the content of which is incorporated herein by reference in its entirety.

FIELD OF THE DISCLOSURE

The systems, methods and apparatuses described herein relate to the authentication of a device.

BACKGROUND

A number of systems rely on proximity of communicating devices for payment processing. For example, contactless payment systems rely on the assumption that a valid user's payment device (such as a smartphone with a payment application, or a payment smartcard) is in proximity to the terminal when the payment is done. Typically, communication mechanism such as Near Field Communication (NFC) are commonly used to verify that communicating devices are in proximity to payment terminals. While such communication mechanism impose restrictions on the distance between communicating devices according to physical properties (for example, NFC operates at distances on the order of centimeters only), systems relying on such communication mechanism are still vulnerable to relay attacks (also called in the art as "mafia-in-the-middle attacks" or "mafia fraud attacks").

In a common scheme, an attacker may use a specially constructed or configured fake device (i.e., an attacker's device) to mislead a payment terminal to communicate with the attacker's device. The attacker's device may in turn be connected to a remote terminal under control of the attacker (i.e., an attacker remote terminal). The attacker's device may communicate the information it receives from the payment terminal to the attacker remote terminal using any communication link suitable for the attacker. The attacker remote terminal may in turn be positioned to communicate with a legitimate device. Then, attacker's device may receive information from legitimate payment terminal, relay it to the attacker remote terminal, which in turn may pass this information to the legitimate device; at the same time, the attacker remote terminal may receive information from legitimate device, relay it to the attacker's device, which in turn may pass this information to the legitimate terminal.

Consequently, during an attack, while the legitimate terminal may appear to be directly communicating with a legitimate device that is in close physical proximity to the legitimate terminal, it in fact may be exchanging information with a legitimate device physically located in any arbitrary location (e.g., at a different place in the same room, at a different room, or even many hundreds or thousands of kilometers away). It should be noted that for this type of attack, attacker doesn't need to interfere with (or to understand) the data exchanged between the legitimate device and legitimate terminal, and therefore, this attack cannot be prevented by means such as encrypting data stream between the legitimate device and legitimate terminal.

Therefore, there is a need in the art for detecting and/or preventing such attacks.

DETAILED DESCRIPTION

Figure 1:
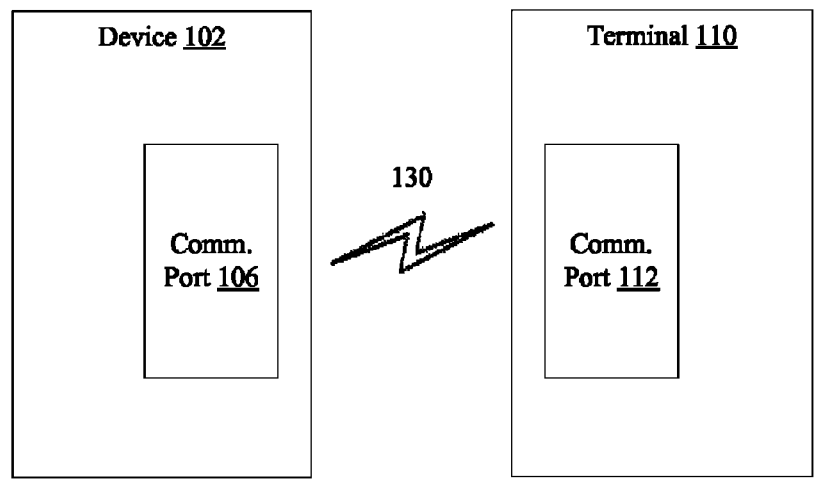
FIG. 1 is a block diagram of an exemplary system according to the present disclosure.

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure provides systems, methods and apparatuses for detecting a relay attack. In one non-limiting example, an apparatus according to the present disclosure may have a communication port, and a processor configured to establish a communication link with a device via the communication port, obtain a list of WiFi service set identifiers (SSIDs) from the device, compare the list of WiFi SSIDs to a list of WiFi SSIDs compiled at the apparatus and determine whether the device is in proximity to the apparatus based on the comparison.

In another embodiment, an apparatus according to the present disclosure may have two communication ports, and a processor configured to establish a first and second communication links with a device via the first and second communication ports respectively, send a first data segment via the first communication link and a second data segment via the second communication link, receive a reply from the device via the first communication link, and process the reply to determine if there is an unreasonable delay in either of the two communication links.

In yet another embodiment, an apparatus according to the present disclosure may have a communication port, and a processor configured to establish a communication link with a device via the communication port, obtain from the device a first list of relay attack detection methods supported by the device, create a second list of relay attack detection methods implemented by the apparatus and supported by the device, perform the relay attack detection methods in the second list, and determine whether there is a relay attack on the communication link based on the relay attack detection results.

FIG. 1 shows an exemplary system 100 according to the present disclosure. The system 100 may comprise a device 102 and a terminal 110. The device 102 may comprise a communication port 106 and the terminal 110 may comprise a communication port 112. The communications ports 106 and 112 may communicate by establishing a communication link 130. Although not shown, each of the device 102 and the terminal 110 may further include hardware elements configured to perform some or all functionalities described herein. The hardware elements may include electronic circuits, such as Central Processing Units, microprocessors, microcontrollers, field programmable gate arrays (FPGAs), application specific integrated circuits (ASICs), System on a Chip (SoC), or any combination thereof. In some embodiments, the functionalities described herein may be implemented in hardware configuration. In some other embodiments, the circuits may be configured to execute software modules that implement the functionalities described herein. In yet some other embodiments, the functionalities described herein may be implemented in combination of hardware and software. Moreover, in some embodiments, the terminal 110 may be a front end of a back end server machine and at least some of the functionalities described herein may be distributed between the terminal 110 and the back end server machine, or the functionalities described herein may be performed solely on the back end server machine and the terminal 110 may be used only to provide the communication channel.

The link 130 may be a wireless communication link. For example, the communication ports 106 and 112 may be compatible ultra-short range (e.g., NFC or capacitance-based transceivers) communication ports that may be used to establish a wireless communication link 130 when the communication ports 106 and 112 are physically within a distance sufficient to establish a communication link. Those with skill in the art recognize that this distance may vary depending on the specific communication link utilized. In some embodiments, the link 130 may be a wired communication link. The wired communication link may be, for example, USB, IEEE 1394, Unshielded Twisted Pair, co-axial cable, etc.

In some embodiments, the device 102 and the terminal 110 may include other components, such as WiFi transceivers (not shown), GPS signal receiver (not shown), 2G/3 G communication module, and/or computation means (e.g. CPUs or application-specific circuitries; not shown).

It is to be understood that embodiment of the present disclosure may be used by any two electronic devices capable of communicating with one another, and that they are not limited to any specific communication technology or implementation. For purposes of illustration only, the device 102 may be a mobile device (such as a mobile phone) or a wireless-enabled smartcard, and the terminal 110 may be a wireless-enabled smartcard reader terminal, or payment terminal accepting payments from wireless-enabled smart-cards and/or from NFC-enabled smartphones. It is also to be understood that the terminal 110 need not be a stationary device and that it, too, may be implemented in a mobile or portable form.

Figure 2A:
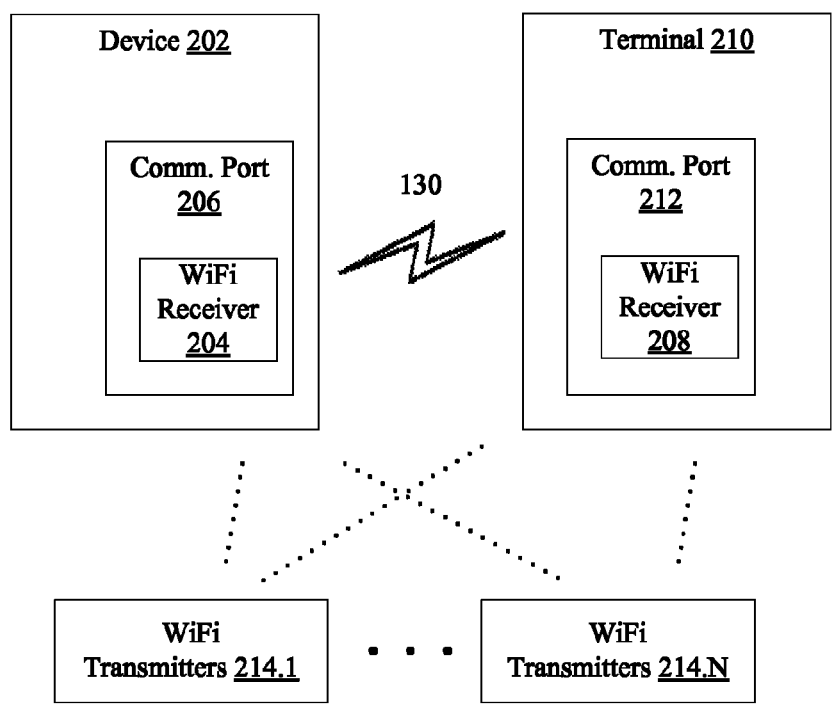
FIG. 2A is a block diagram of another exemplary system according to the present disclosure.

FIG. 2A shows a system 200 according to one embodiment of the present disclosure. The system 200 may comprise a device 202, a terminal 210, and one or more WiFi transmitters (214.1 through 214.N, N being any integer number). The device 202 may be an embodiment of the device 102 and contains all features of the device 102. The terminal 210 may be an embodiment of the terminal 110 and contains all features of the terminal 110. The communication port 206 may be an embodiment of the communication port 106 and may comprise a WiFi receiver 204. The communication port 212 may be an embodiment of the communication port 112 and may comprise a WiFi receiver 208. The communication link 130 between the device 202 and terminal 210 may be identical to the link 130 shown in FIG. 1. The one or more WiFi transmitters 214.1~214.N may be transmitters in an operational range to the device 202 and terminal 210 that both WiFi receivers 204 and 208 can receive their WiFi signals. Some of these WiFi transmitters 214 may be a part of the device 202 or the terminal 210, while other WiFi transmitters 214 may be external to the device 202 and terminal 210. For example, some of the WiFi transmitters 214 may be a part of other devices transmitting WiFi signals, which happened to be in an operational range to the device 202 and the terminal 210.

Figure 2B:
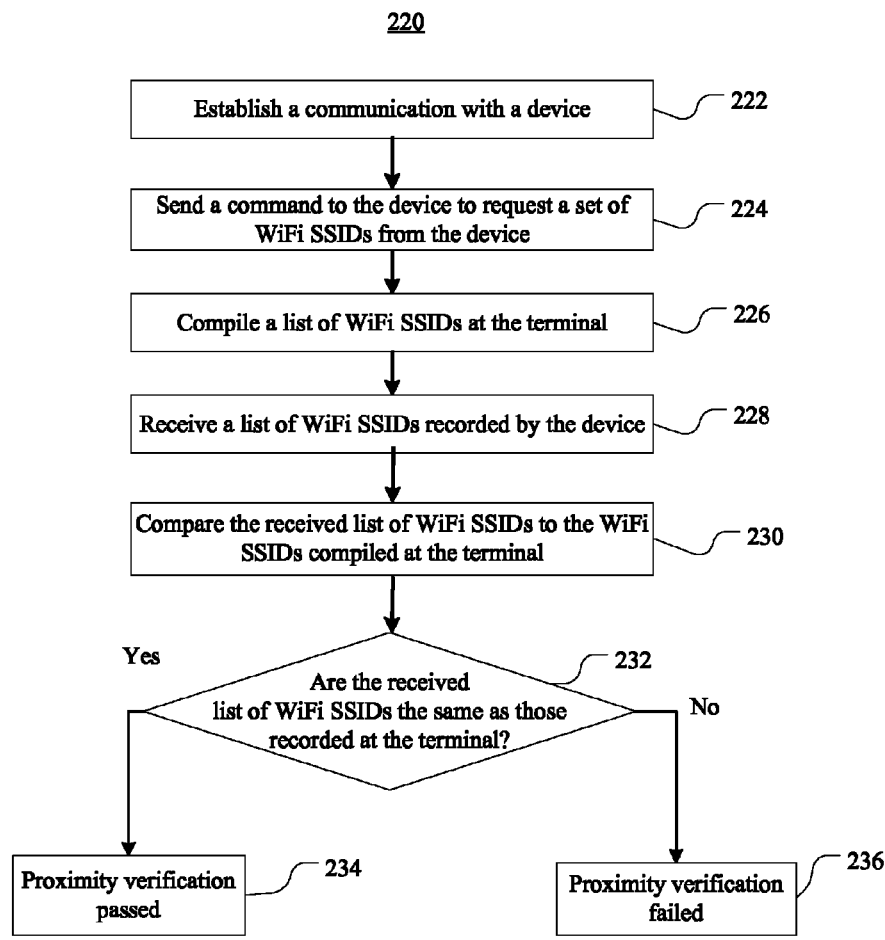
FIG. 2B is a flow diagram illustrating an exemplary process for authenticating a device according to the present disclosure.

FIG. 2B illustrates an exemplary method 220 according to one embodiment of the present disclosure. The method 220 may be used by an embodiment of the terminal 210 to determine whether the device 202 and the terminal 210 are located at least within an operating distance of one or more WiFi transmitters.

At block 222, the terminal 210 may establish the communication link 130 with the device 202. The details of establishing such a data connection may depend on the particular type of communication link 130 used in a particular implementation. For example, in some embodiments, establishing the data connection may be initiated by the terminal 210, and in some other embodiments, establishing the data connection may be initiated by the device 202. In addition, an optional logical channel (such as TCP connection, X.25 connection, Sequenced Packet Exchange (SPX) connection, High-Level Data Link Control (HDLC) connection, SSL/TLS connection over any of these connections, or similar connection; in some embodiments, logical channel may consist of multiple TCP connections, X.25 connections, Sequenced Packet Exchange (SPX) connections, High-Level Data Link Control (HDLC) connections, SSL/TLS connections, other similar connections, or combinations of them) may be established over the communication link 130. In some other embodiments, equivalent security may be established by alternative means, both known in the art and developed in the future.

At block 224, the terminal 210 may send a command to the device 202 to request a set of WiFi service set identifiers (SSIDs) from the device 202. For example, the command may request the device 202 to collect some or all SSIDs for WiFi transmitters the device 202 may receive signal from.

Figure 2C:
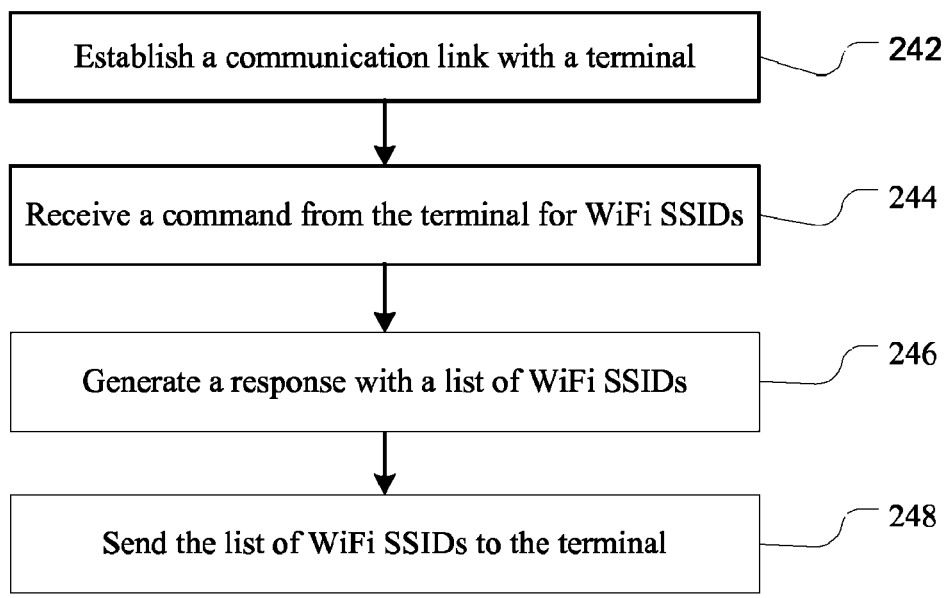
FIG. 2C is a flow diagram illustrating another exemplary process for a device to be authenticated according to the present disclosure.

FIG. 2C is a flow diagram illustrating an exemplary method 240 for the device 202 to respond the command with WiFi SSIDs according to the present disclosure. As shown in FIG. 2C, at block 242, the device 202 may establish the communication link 130 with the terminal 210. As described above, the details of establishing such a data connection may depend on the particular type of communication link 130 used in a particular implementation and an optional logical channel over the communication link 130 may be established. At block 244, the device 202 may receive the command from the terminal that asks for WiFi SSIDs. At block 246, the device 202 may generate a response that contains a list of WiFi SSIDs. The list of WiFi SSIDs may include some or all SSIDs for the transmitters in an operational range to the device 202 from which the device 202 may receive signals. In certain embodiments, the device 202 itself may comprise one or more WiFi transmitters and the device 202 may include these WiFi SSIDs into the list of the WiFi SSIDs generated by the device 202. At block 248, the device 202 may send the response containing the list of WiFi SSIDs to the terminal 210. In some embodiments, the response may be sent over the secure communication channel.

Referring back to the method 220 in FIG. 2B, at block 226, the terminal 210 may compile a list of WiFi SSIDs for transmitters in an operational range to the terminal 210 that the terminal 210 may receive signal from. In certain embodiments, the terminal 210 itself may comprise one or more WiFi transmitters and the terminal 210 may include the WiFi SSIDs for any its own WiFi transmitters into the list of the WiFi SSIDs compiled by the terminal 210. At block 228, the terminal 210 may receive the list of WiFi SSIDs from the device 202. At block 230, the terminal 210 may compare the received list of WiFi SSIDs to the list of WiFi SSIDs compiled at the terminal 210. At block 232, the terminal 210 may determine whether the received list of WiFi SSIDs are the same as those compiled at the terminal 210.

If the lists are the same, then at block 234, the terminal 210 may determine that the device 202 has passed the proximity verification because the terminal 210 and the device 202 may receive signals from the same set of WiFi transmitters. The successful proximity verification as described herein may indicate that the link 130 is not under a relay attack.

If, on the contrary, the lists are not the same, the terminal 210 may determine that the device 202 has failed the proximity verification because the terminal 210 and the device 202 do not receive signals from the same set of WiFi transmitters. For example, if a certain WiFi SSID is in the list received from the device 202 but not in the list compiled by the terminal 210, this may mean that the device 202 may receive the signal from the certain transmitter while the terminal 102 cannot receive a signal from this transmitter. This is unlikely if the terminal 210 and the device 202 are in close proximity to each other and thus, in this case the proximity verification may be deemed as failed. The failed proximity verification as described herein may indicate that the link 130 is under a relay attack.

In some embodiments, instead of requiring the received list of WiFi SSIDs are the same as the list of WiFi SSIDs compiled at the terminal 210, a threshold value greater than zero may be predetermined. That is, whether the test is considered successful or failed may depend on whether the number of different SSIDs exceeds this threshold value. For example, if the list received from the device 202 has SSIDs A, B, C and the list compiled at the terminal 210 has SSIDs A, B, D. There are two different SSIDs C and D. If the threshold is 3, then the proximity verification may be deemed as passed and no relay attack is detected. If the threshold value is 2, however, the proximity verification may be deemed as failed and the link 130 is under a relay attack.

In some other embodiments a threshold value may be a ratio of the number of different SSIDs to the total number of SSIDs in the list. For example, if such a threshold is 1/4, and if there are 9 SSIDs in the list received from the device 202, and two of them cannot be matched to SSIDs collected by the terminal 210, then the verification may be deemed passed because the ratio is 2/9, which is less than the threshold value 1/4. If the full list of SSIDs is shorter, for instance, consisting of 5 SSIDs, the same number of different SSIDs (two) will fail the verification test because the ratio is 2/5, which is larger than the threshold (1/4).

In some embodiments, in addition to SSIDs, WiFi channel numbers associated with SSIDs may be additionally sent from the device 202 and checked at the terminal 210.

In some embodiments, the device 202 may start gathering information about SSIDs in advance. For example, terminal 210 may broadcast via WiFi that such information may be requested for authentication purposes.

Also, in some embodiments of the method 220, instead of or in addition to WiFi SSIDs, the terminal 210 may request the device 202 to record some information transmitted over a WiFi channel with a specific SSID (or with a specific WiFi channel number). The terminal 210 may also record such information itself, and compare the recorded information with that received from the device 202. Such information may include, for example, information from certain WiFi frames transmitted over a WiFi channel with a specific SSID. It should be noted that even if the WiFi frames are encrypted, they can still be used for these purposes without being decrypted. As discussed above, if the data, at least in part, does not match, this may indicate that the terminal 210 and the device 202 receive signals from different WiFi transmitters, and, therefore, are not in close proximity to each other and the link 130 is under a relay attack.

In some embodiments, instead of using any recorded data directly, hash values of received WiFi frames (or of certain parts and/or fields of these frames) may be computed, recorded, sent from the device 202 to the terminal 210 and compared. In some embodiments, in addition to hash values, certain fields of the received WiFi frames may be sent along with these hash values. If a particular frame, for example, due to communication errors, has not been received successfully, its hash in the sequence of hash values may be accompanied with a special flag indicating this case. For example, the device 202 may send a sequence of hash values to the terminal 210, and the terminal 210 may compare the received sequence with a sequence the terminal 210 computed itself. If the sequences have identical segments of at least a predefined length (e.g., up to flagged hashes, or up to a pre-defined threshold to allow for communication errors), the proximity verification may be deemed as a success, and the terminal 210 may determine that the terminal 210 and the device 202 have received signals from the same WiFi transmitter.

In some embodiments, the terminal 210 may comprise one or more WiFi transmitters (not shown on FIG. 2A) and may use these WiFi transmitter to provide WiFi data to be received by the device 202 and sent back over a secure communication channel to the terminal 210. In these embodiments, the terminal 210 may compare the WiFi data transmitted and received to detect a relay attack. This may be used regardless of whether there are any activities on other WiFi channels in the vicinity.

It should be understood that, in place of or in addition to WiFi, other methods of communication, such as BlueTooth, signals from cellular network base stations, GPS satellites, etc. may be used. In such cases both the terminal 210 and the device 202 may be equipped with respective communication components, such as, for example, BlueTooth receiver, 2G/3 G communication module, GPS signal receiver, etc. In addition, in place of WiFi SSIDs, other identifiers may be used. For example, cellular network operator name, channel number or frequency, IDs of GPS satellites, etc.

It should be noted that methods described with respect to FIG. 2B may provide detection of relay attacks with a precision from several meters to several hundred meters. In particular, if WiFi is used, proximity may be established up to a few dozens of meters.

Figure 3A:
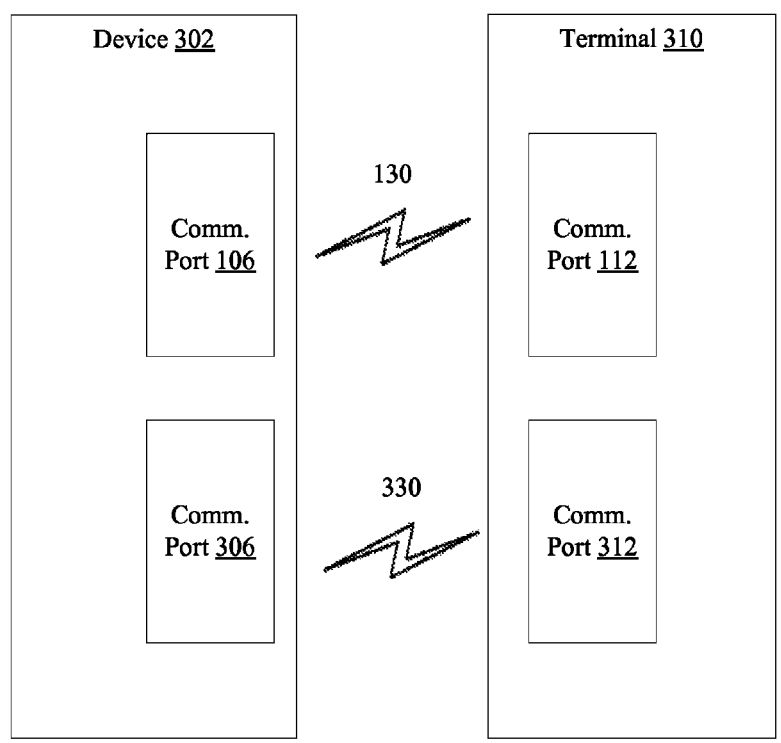
FIG. 3A is a block diagram of another exemplary system according to the present disclosure.

FIG. 3A shows a system 300 according to another embodiment of the present disclosure. The system 300 may comprise a device 302 and a terminal 310. The device 302 may be an embodiment of the device 102 and contains all features of the device 102 including the communication port 106. The terminal 310 may be an embodiment of the terminal 110 and contains all features of the terminal 110 including the communication port 112. The communication link 130 between the device 302 and terminal 310 may be identical to the link 130 shown in FIG. 1. In addition to the communication port 106, the device 302 may further comprise a communication port 306. The communication port 306 may be a WiFi communication port and comprise a WiFi receiver or both WiFi transmitter and receiver. In addition to the communication port 112, the terminal 310 may further comprise a communication port 312. The communication port 312 may be a WiFi communication port and comprise both WiFi transmitter and receiver (or a transceiver). Thus, in addition to the communication link 130, the device 302 and terminal 310 may also communicate via a communication link 330 established by the communication ports 306 and 312. In some embodiments, instead of WiFi, the communication link 330 may use other methods of connection, such as BlueTooth or custom radio wave connection. In these embodiments, instead of being WiFi communication ports, the communication ports 306 and 312 may be other corresponding communication components.

Figure 3B:
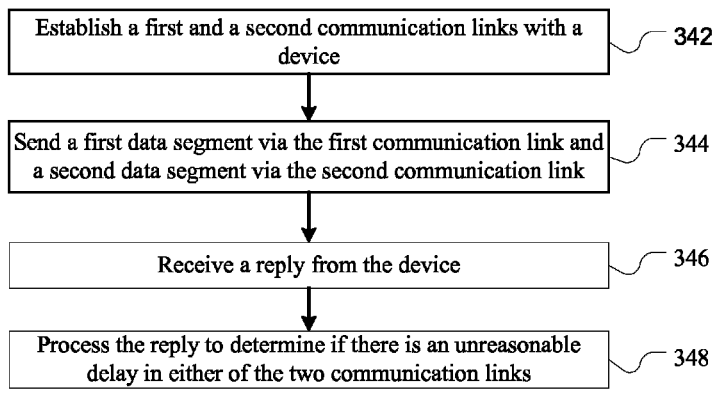
FIG. 3B is a flow diagram illustrating an exemplary process for authenticating a device according to the present disclosure.

FIG. 3B shows a method 340 according to one embodiment of the present disclosure. At block 342, the terminal 310 may establish the communication links 130 and 330 with the device 302. The details of establishing such data connections may depend on the particular types of communication links 130 and 330 used in a particular implementation. For example, in some embodiments, establishing the data connection may be initiated by the terminal 310, and in some other embodiments, establishing the data connection may be initiated by the device 302. In addition, an optional logical channel, such as described above with respect to block 222 may be established over either or both of the communication links 130 and 330. In some other embodiments, equivalent security may be established by alternative means, known in the art and/or developed in the future.

At block 344, the terminal 310 may send two data segments to the device 302 using the link 130 for the first data segment, and link 330 for the second data segment. In some embodiments, the first data segment may comprise a first nonce, and the 2nd data segment may comprise a second nonce.

Figure 3C:
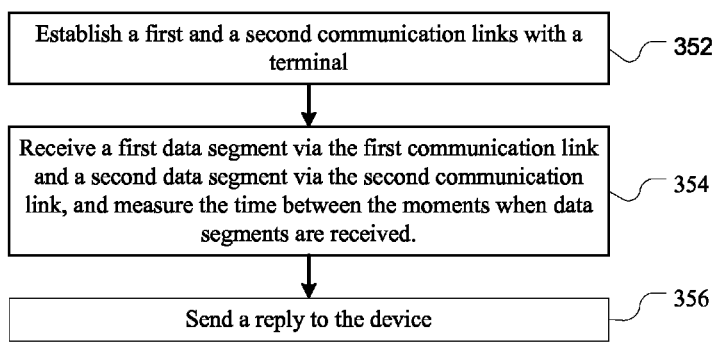
FIG. 3C is a flow diagram illustrating another exemplary process for a device to be authenticated according to the present disclosure.

FIG. 3C is a flow diagram illustrating an exemplary method 350 for the device 302 to respond to the terminal 310 according to the present disclosure. As shown in FIG. 3C, at block 352, the device 302 may establish the communication links (e.g., 130 and 330) with the terminal 310. As described above, the details of establishing such data connections may depend on the particular types of communication links 130 and 330 used in a particular implementation, and an optional logical channel over the communication links 130 and/or 330 may be established. At block 354, the device 302 may receive the first data segment via the communication link 130 and the second data segment via the communication link 330, and measure a time difference between the moments when the two data segments are received. At block 356, the device 302 may send a reply back to terminal 310, for example, using the communication link 130 or using the communication link 330. In some embodiments, the reply may comprise the first nonce from the first data segment, the second nonce from the second data segment, and the time difference measured in block 354. In embodiments where a secure channel is established between the terminal 310 and device 302, the reply may be sent over the established secure communication channel.

Referring back to the method 340 in FIG. 3B, at block 346, the terminal 310 may receive the reply from the device 302. At block 348, the terminal 310 may process the reply to determine whether there is an unreasonable delay in either of the two communication links. For example, the terminal 310 may determine whether the nonces received in the reply match to the first nonce and the second nonce sent to the device 302. Also, the terminal 310 may determine whether the time difference measured by the device 302 is within a predefined threshold. If the nonces do not match, or if the data sent through one link has been received substantially later than the data sent via the other link such that the measured time difference is greater than a predefined time difference, this may indicate that there are delays with data transmission on the slower link, which, in turn, may indicate that a relay attack has been mounted against that link. In some embodiments, the time difference may be compared with a predefined threshold by the device 302 and the comparison result may be included in the reply sent back to the terminal 310.

In some embodiments, instead of using the device 302 to measure the time difference, the device 302 may echo each of the received data segments back to the terminal 310 over the same link through which the data segment is received, and the time difference may be measured by the terminal 310.

In some embodiments, to avoid measuring the time difference at the device 302, alternative embodiments of the methods 340 and 350 may be used. In one alternative embodiment, after sending the first data segment over the link 130, the terminal 310 may start transmitting data frames each with a unique identifier using the communication link 330. In some embodiments, each data frame may also contain a different nonce. In addition, the terminal 310 may record the moment each such frame is transmitted. The device 302 may receive the first data segment via the link 130, and receive a data frame currently being transmitted via the link 330. In one embodiment, the device 302 may send this frame back to the terminal 310. In this embodiment, the terminal 310 may use recorded moments for each frame being sent to determine the duration between the time when the data segment is transmitted over the link 130 (which roughly corresponds to transmitting the first frame over the link 330) and the time when that data segment is received by the device 302 (which roughly corresponds to the time of the frame concurrently received by the device 302 over the link 330). If the delay determined in such a way is greater than a predefined threshold, this may indicate that a relay attack has been mounted.

In another alternative embodiment, the data frames sent from the terminal 310 may have timing data embedded therein. For example, the terminal 310 may add to each frame transmitted via the link 330 the time passed since the first frame of the data segment was sent via the link 130 until the current frame is about to be sent via the link 330. In this embodiment, using such timing data, the device 302 may determine if there is any delay in receiving the data segment via the link 130 and may conclude whether there is a potential relay attack.

It should be noted that in some alternative embodiments the device 302 and the terminal 310 may play the opposite roles by implementing methods similar to methods 340 and 350, respectively. In these embodiments, the communication port 306 of the device 302 may comprise a WiFi transmitter, and the communication port 312 of the terminal 310 may comprise a WiFi receiver. The device 302 may implement a method similar to method 340 and may start transmitting data frames each with a unique identifier using the communication link 330 after transmitting the first data segment to the terminal 310 over the link 130. The terminal 310 may implement a method similar to method 350 and may use the frame received via the link 330 concurrently with the first data segment received via the link 130 to determine the time period from the first data segment being sent to being received, or may send the frame identifier to the device 302 so that the device 302 may determine the time delay in receiving the data segment over the link 130.

It should be noted that in some embodiments methods 340 and 350 may be repeated more than one time to ensure that delays in data transmission are not due to occasional communication errors and/or processing errors at the device 302 and/or the terminal 310.

Figure 4A:
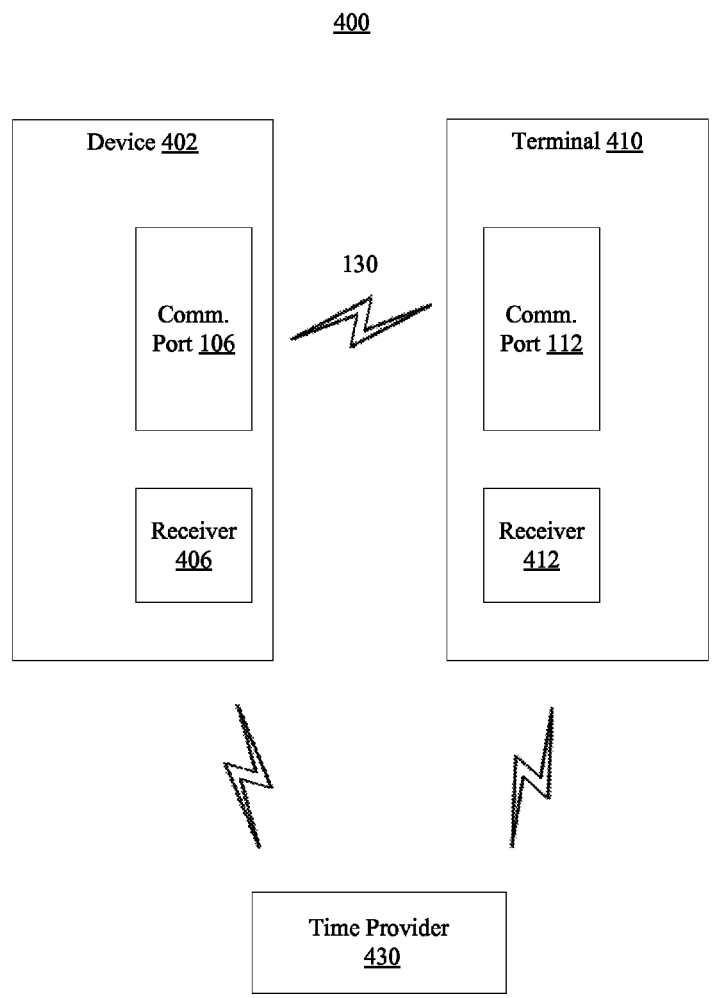
FIG. 4A is a block diagram of another exemplary system according to the present disclosure.

FIG. 4A shows a system 400 according to another embodiment of the present disclosure. The system 400 may comprise a device 402, a terminal 410 and a time provider 430. The device 402 may be an embodiment of the device 102 and contains all features of the device 102 including the communication port 106. The terminal 410 may be an embodiment of the terminal 110 and contains all features of the terminal 110 including the communication port 112. The communication link 130 between the device 402 and terminal 410 may be identical to the link 130 shown in FIG. 1.

In addition to the communication port 106, the device 402 may further comprise a receiver 406. In addition to the communication port 112, the terminal 410 may further comprise a receiver 412. The receivers 406 and 412 may be configured to receive signals from the time provider 430, as shown on FIG. 4A. In some embodiments, the time provider 430 may be a precise time provider, such as a GPS satellite network (with signal coming either from the same GPS satellite, or from different GPS satellites), and receivers 406 and 412 may be GPS signal receivers. In some embodiments, instead of GPS, other standard timing signals, such as WWVB time signal provided by National Institute of Standards and Technology (NIST) in the United States or MSF time signal in the United Kingdom may be used. And the receivers 406 and 412 may be corresponding signal receivers for those timing signals.

Figure 4B:
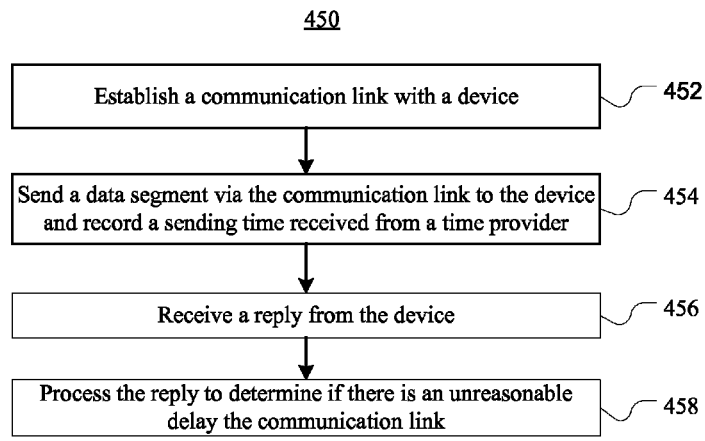
FIG. 4B is a flow diagram illustrating an exemplary process for authenticating a device according to the present disclosure.

FIG. 4B illustrates an exemplary method 450 according to one embodiment of the present disclosure. The method 450 may be used by an embodiment of the terminal 410 to determine whether there are any delays on the communication link 130 between the device 402 and the terminal 410. At block 452, the terminal 410 may establish the communication link 130 with the device 402 as described above with respect to block 222. At block 454, the terminal 410 may send data to the device 402, and record a sending time received from the time provider 430. In some embodiments, the sending time may be a precise time provided by the time provider 430 at the exact moment the data is sent.

Figure 4C:
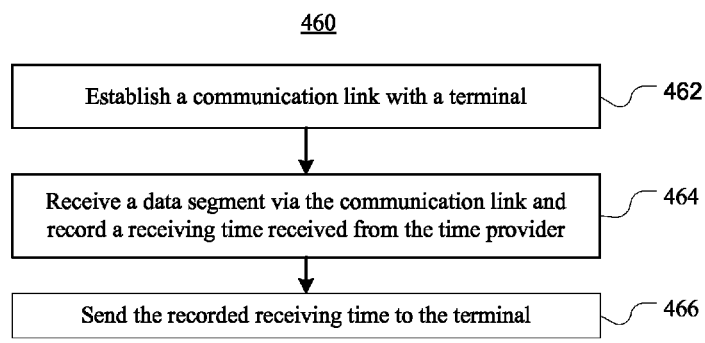
FIG. 4C is a flow diagram illustrating another exemplary process for a device to be authenticated according to the present disclosure.

FIG. 4C is a flow diagram illustrating an exemplary method 460 for the device 402 to respond to the data sent by the terminal 410 according to the present disclosure. As shown in FIG. 4C, at block 462, the device 402 may establish the communication link 130 with the terminal 410. As described above, the details of establishing such a data connection may depend on the particular type of communication link 130 used in a particular implementation and an optional logical channel over the communication link 130 may be established. At block 464, the device 402 may receive the data sent by the terminal 410 and record a receiving time received from the time provider 430. In some embodiments, the receiving time may be a precise time provided by the time provider 430 at the exact moment the data is received. In some other embodiments, this time may be calculated based on the precise time provided by the time provider 430 prior to the moment that the data is received. For example, the time provider 430 may transmit signals with precise time values periodically (e.g., each second). The device 402 may calculate the time passed since the last precise time value has been received and add the calculated time to the last received precise time value to obtain the precise time when the data is received. At block 466, the device 402 may send the receiving time to the terminal 410. In some embodiments, for example, the receiving time may be sent over the secure communication channel.

Referring back to the method 460 in FIG. 4B, at block 456, the terminal 410 may receive the reply from the device 402. In some embodiments, the reply may include the receiving time recorded at the device 402. At block 458, the terminal 410 may process the reply to determine whether there is an unreasonable delay in the communication link 130. For example, using the sending time recorded at the terminal 410 and the receiving time included in the reply from the device 402, the terminal 410 may calculate the time period it takes for data transmission from the terminal 410 to the device 402. If this time period is greater than a predefined time threshold, this may indicate that there are delays with the data transmission on the link 130, which, in turn, may indicate that there may be a relay attack against that link. In some embodiments, a sending time may be included into the data sent from the terminal 410, and the time period may be calculated by the device 402 and the threshold optionally checked also by the device 402.

It should be noted that in some embodiments methods 440/450 may be repeated more than one time to ensure that delays in data transmission are not due to occasional communication errors and/or processing errors at the device 402 and/or the terminal 410.

Figure 5A:
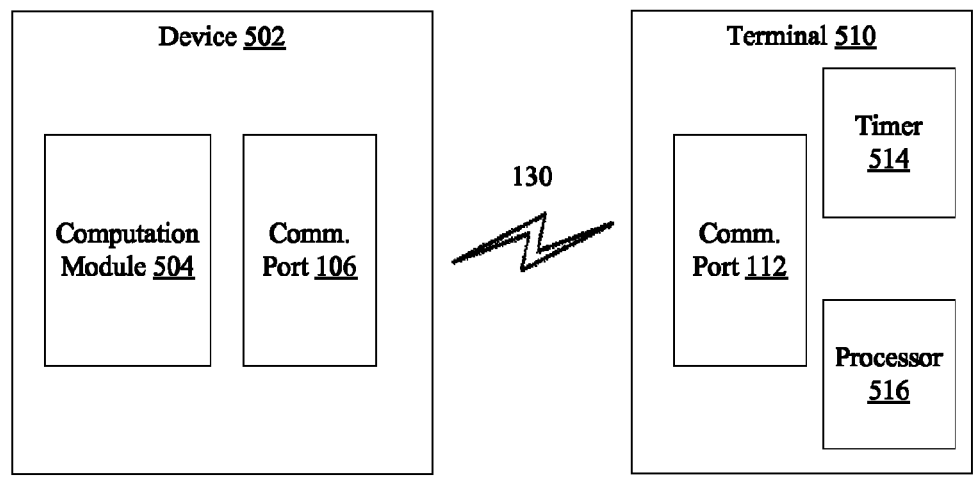
FIG. 5A is a block diagram of another exemplary system according to the present disclosure.

FIG. 5A shows a system 500 according to one embodiment of the present disclosure. The system 500 may comprise a device 502 and a terminal 510. The device 502 may be an embodiment of the device 102 and contains all features of the device 102 including the communication port 106. In addition, the device 502 may further comprise a computation module 504. The terminal 510 may be an embodiment of the terminal 110 and contains all features of the terminal 110 including the communication port 112. In addition, the terminal 510 may further comprise a timer (or counter) 514 and a processor 516. Although the timer (or counter) 514 is shown as a separate component, in certain embodiments, the timer 514 may be implemented as part of the processor 516 (e.g., in software or hardware), or may be integrated into other components of the terminal 510. The communication link 130 between the device 502 and terminal 510 may be identical to the link 130 shown in FIG. 1. The computation module 504 may be used for fast computation of functions (e.g., cryptographical functions) related to detection of relay attacks that are discussed herein.

Figure 5B:
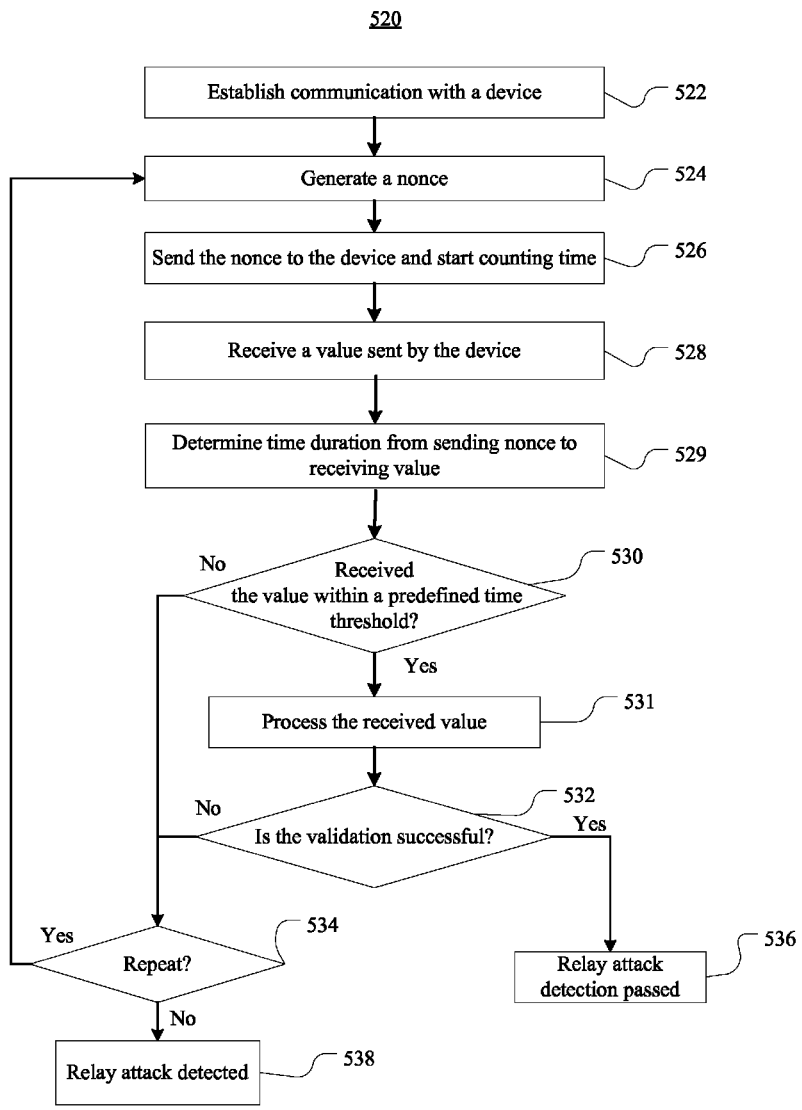
FIG. 5B is a flow diagram illustrating an exemplary process for authenticating a device according to the present disclosure.

FIG. 5B illustrates an exemplary method 520 that may be implemented by the terminal 510 to check whether a relay attack is mounted against its communication with the device 502. The method 520 may start at block 522, at which the terminal 510 may establish the communication link 130 with the device 502 to communicate data between the device and the terminal. As described above, the details of establishing such a data connection may depend on the particular type of communication link 130 used in a particular implementation and an optional logical channel over the communication link 130 may be established.

At block 524, a nonce may be generated. For example, a cryptographically safe random number generator (implemented in hardware, not shown, or implemented in software running on the processor 516) may be used for this purpose. At block 526, the generated nonce may be sent to the device 502 as a request and the timer 514 may be started to count time from when the nonce is sent.

Figure 5C:
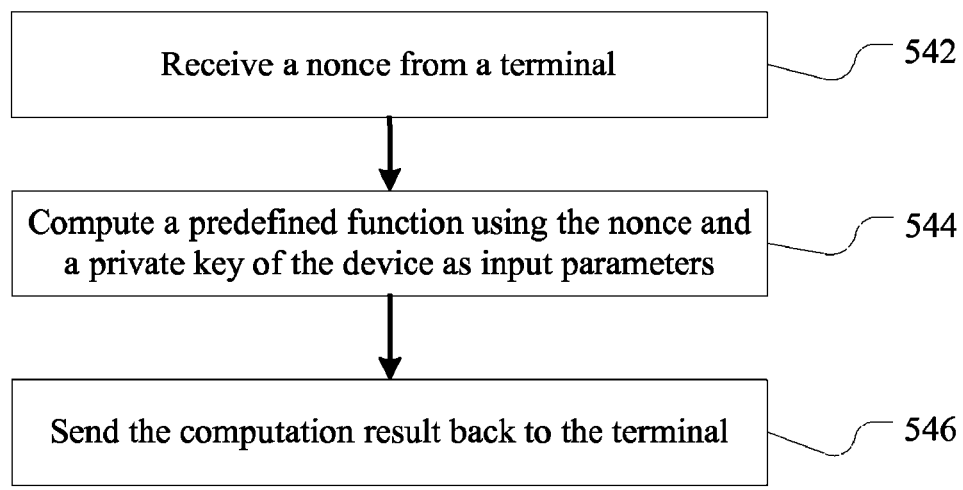
FIG. 5C is a flow diagram illustrating another exemplary process for a device to be authenticated according to the present disclosure.

The device 502 may implement an exemplary method 540 shown on FIG. 5C to process the request. At block 542, the device 502 may receive the nonce. Then at block 544, the device 502 may compute a verification value using a predefined function. The predefined function may use both a private key of the device 502 and the received nonce to calculate the verification value. In some embodiments, the predefined function may be selected such that all bits of the nonce are necessary to start the computation, and the resulting bits are obtained simultaneously. For example, in one non-limiting embodiment, the predefined function may be an encryption of the nonce with the private key of the device 502 by the computation module 504. Then the method 540 may proceed to block 546, at which the verification value may be sent back to the terminal 510 as a response.

Referring back to FIG. 5B, after sending the nonce to the device 502, the exemplary method 520 may proceed from block 526 to block 528, at which a value may be received by the terminal 510. As described above with respect to FIG. 5C, the received value may be the verification value generated by the device 502 using the predefined function. At block 529, the time at which the value is received is determined and a time duration between when the nonce was sent and the value received is determined or calculated.

At block 530, the time duration between the nonce being sent and the verification value being received is compared to a predefined time threshold $T_{th}$. If the time between the nonce being sent and the verification value being received exceeds the predefined time threshold, this may indicate that the computation was performed by a device located at a distance greater than expected (or permitted) and the method may proceed to block 538 (or optionally to block 534). This may indicate that the link 130 is under a relay attack.

If the time between the nonce being sent and the verification value being received is within the predefined time threshold, the method 520 proceeds to block 531 at which the received verification value may be processed. The processing may be performed by the terminal 510 using procedures specific to the predefined function used by the device 502.

In an embodiment, if the predefined function used by the device 502 is to encrypt the nonce using the private key of the device 502 (as described above with respect to block 544), the processing may be done using a function that decrypts the received value using the public key of the device 502. The decrypt function may decrypt the received value to recover the nonce. For example, in some embodiments, the terminal 510 may obtain a public key of the device 502, and ensure that the public key is properly certified by a trusted third party (e.g., a certificate authority). Such certification may mean that this public key corresponds to a specific private key, which belongs to a trusted device. Accordingly, based on the certification of the public key and the assumption that a trusted device does not expose its private key to any third parties, it can be assumed that calculation of the predefined function has actually been done at the trusted device and not somewhere else.

It should be noted that the public key of the device may be obtained at any time prior to or after receiving the verification value, as long as it is received before the processing of block 531 begins. For example, the public key may be stored in a volatile or non-volatile storage of the terminal 510 after it has been received during a previous communication session between the terminal 510 and a trusted third party, or may be installed on the terminal 510 by the vendor of the terminal 510.

At block 532 the decrypted value may be compared to the nonce sent to the device 502. If they are the same, at block 536 the method 520 may determine that the relay attack detection has passed with no relay attack detected. Passing the relay attack detection at block 536 may be interpreted as "the owner of the private key that corresponds to the public key used in block 531 is on the other end of the logical channel established in block 522, and no relay attack on the channel has been detected". This may indicate that the link 130 is not under a relay attack. In some embodiments, if the communication between the two communicating parties is through a protected logical channel (such as SSL/TLS connection(s) over the communication link), the process 520 may provide strong relay attack detection and authentication assurances.

If either the time check at block 530 or the validation determination at block 532 fails, the method 520 may proceed to block 528, at which the method 300 may determine that the link 130 is under a relay attack. For example, if the time check at block 530 or the validation determination at block 532 fails, the terminal 510 may determine that there is a possibility that the communication link 130 or the logical channel established over the communication link 130 has been compromised or that the device 502 may be a fake device.

In one or more embodiments, to handle occasional communication errors, the method 520 may attempt to repeat the blocks 524-532 as indicated by block 534, which may be optional. In some embodiments, the number of retransmission attempts may be limited (for example, to a number like 3 or 5 times).

Because the amount of time spent on calculation of the predefined function at the device 502 may affect the value of $T_{th}$, some embodiments may use a function that can be computed faster than asymmetric encryption using a private key. It should be noted that both encryption and decryption of the nonce using asymmetric cryptography may take time in the order of tens of milliseconds. Thus, in some embodiments, another predefined function with a faster computing speed may be implemented. For example, a predefined function that utilizes two parameters may be used such that one parameter may be the nonce, and the other may be a parameter V, which may be generated (in some embodiments, randomly) by the device 502.

In one embodiment, the other predefined function may be a symmetric encryption function that uses the parameter V as the encryption key for a symmetric encryption of the nonce. The symmetric encryption, for example, may be implemented to complete within 10 microseconds, which is likely to be several orders of magnitude less than the asymmetric encryption of the same nonce. In another embodiment, the other predefined function may be a hash function that computes a hash value of a concatenation of the nonce and the parameter V. It is to be understood that these embodiments are merely exemplary and that the scope of the present invention is broad enough to encompass any appropriate presently known or future-developed functions.

Figure 6A:
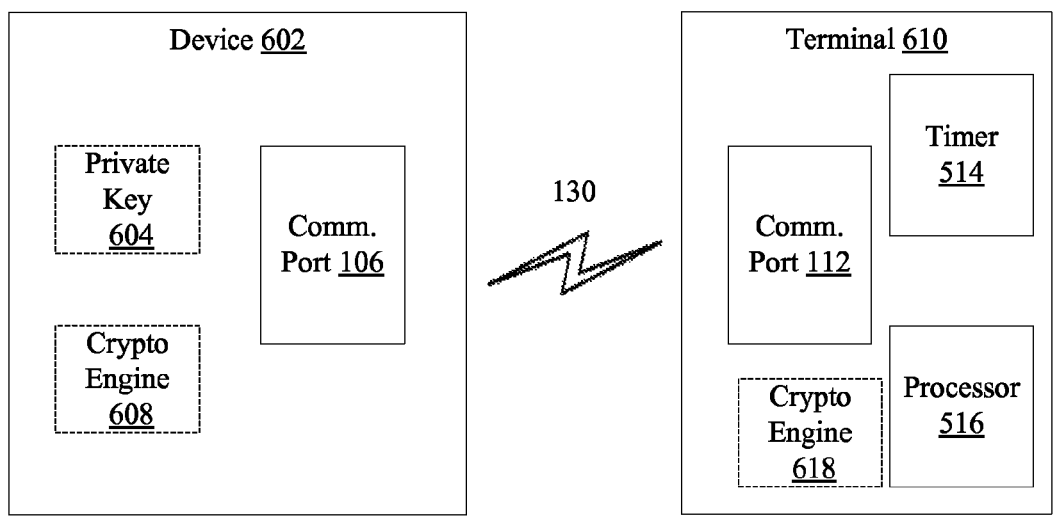
FIG. 6A is a block diagram of another exemplary system according to the present disclosure.

FIG. 6A shows another exemplary system 600 according to the present disclosure. The system 600 may comprise a device 602 and a terminal 610. The device 602 may be an embodiment of the device 102 and contains all features of the device 102 including the communication port 106. In addition, the device 602 may further optionally comprise a private key 604 and a crypto engine 608. The optional private key 604 may be stored in a non-volatile storage (not shown) of the device 602. The terminal 610 may be an embodiment of the terminal 510 and contains all features of the terminal 510 including the communication port 112, the timer 514 and the processor 516. In addition, the terminal 610 may further optionally comprise a crypto engine 618. The communication link 130 between the device 502 and terminal 510 may be identical to the link 130 shown in FIG. 1.

In embodiments where the crypto engines 608 and 618 are present, they may be implemented in hardware, software, or combination of hardware and software. Moreover, in some embodiments, the functionality of the crypto engine 618 may be implemented by the processor 516 either in hardware or software and a separate crypto engine 618 may not be necessary.

Figure 6B:
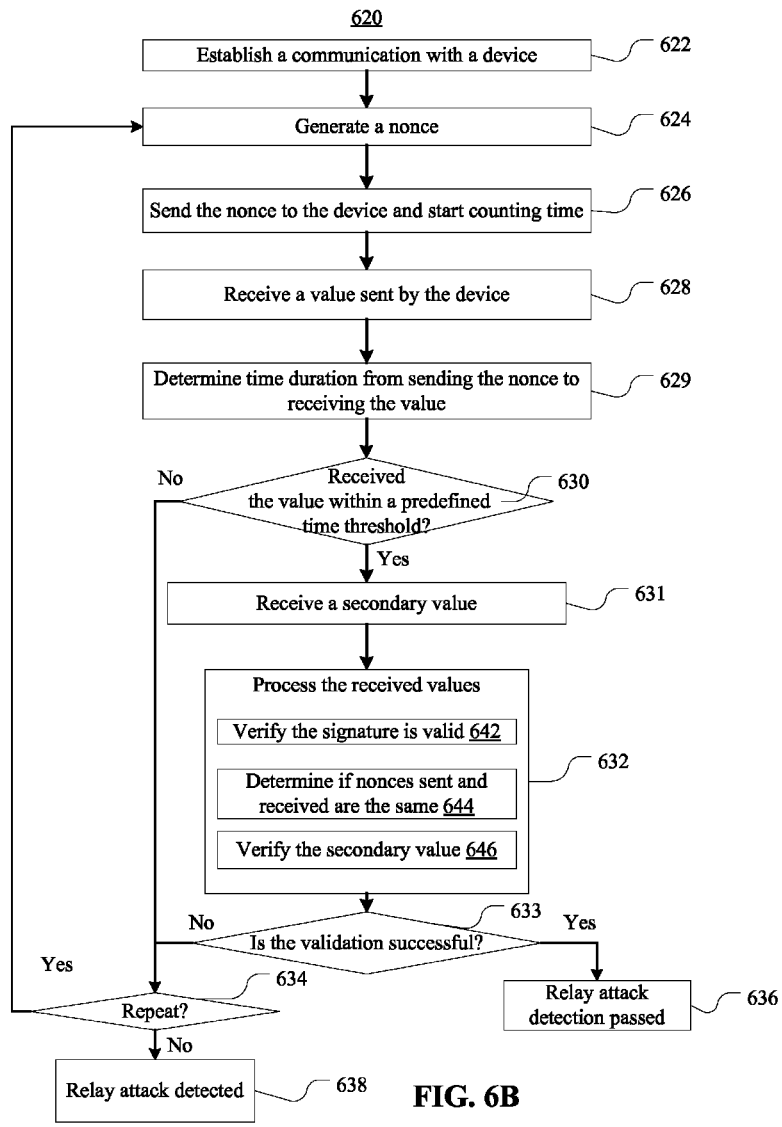
FIG. 6B is a flow diagram illustrating an exemplary process for authenticating a device according to the present disclosure.

FIG. 6B illustrates an exemplary method 620 that may be implemented by the terminal 610 to check whether a relay attack is mounted against its communication with the device 602. The method 620 may start at block 622, at which the terminal 610 may establish the communication link 130 with the device 602 to communicate data between the device and the terminal. As described above, the details of establishing such a data connection may depend on the particular type of communication link 130 used in a particular implementation and an optional logical channel over the communication link 130 may be established.

At block 624, a nonce may be generated. For example, a cryptographically safe random number generator implemented in hardware (not shown) or implemented in software running on the processor 516 may be used for this purpose. At block 626, the generated nonce may be sent to the device 602 and the timer 514 may be started to count time from when the nonce is sent.

Figure 6C:
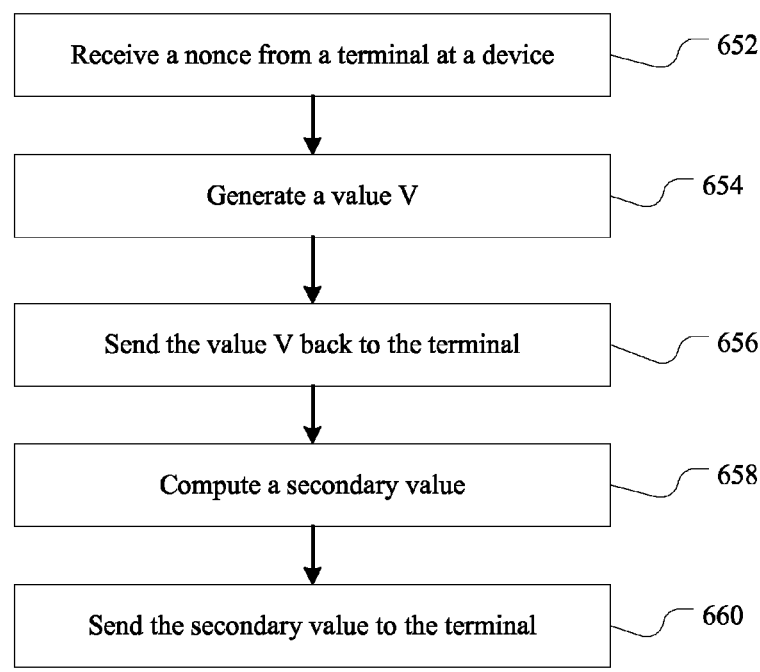
FIG. 6C is a flow diagram illustrating another exemplary process for a device to be authenticated according to the present disclosure.

The device 602 may implement an exemplary method 650 shown in FIG. 6C corresponding to the exemplary method 620. At block 652, the device 602 may receive the nonce. At block 654, the device 602 may generate a value V. In one embodiment, the value V (which may also be referred to as the parameter V) may be generated using a random number generator (not shown) and may be a random number that cannot be predicted and/or computed outside the device 602. In some embodiments, to speed up the processing within block 654, the value V may be pre-generated (as long as it is not previously disclosed outside the device 602). At block 656, the value V (also referred to as a verification value) may be sent to the terminal 610.

Referring back to the exemplary method 620 on FIG. 6B, at block 628, the terminal 610 may receive the verification value from the device 602, and at block 629 may determine the time T elapsed from sending the nonce until receiving the verification value. At block 630, the time T may be compared to a predefined time threshold $T_{th}$. Setting an appropriate time threshold $T_{th}$ may significantly reduce or eliminate the possibility of a man-in-the-middle attack as described above, or variations thereof. For example, if it is known that, without a relay attack, processing according to the discussed method (that is, time between sending a nonce and receiving the verification value V) requires 2 milliseconds, and with a relay attack, the same would take at least 6 milliseconds, then setting $T_{th}$ in the range of 3-5 milliseconds may help detection of relay attacks (as time will be greater than $T_{th}$) while connections without relaying may pass the check. If the verification value is not received within the predefined time threshold $T_{th}$, then, from block 630, the method 620 may proceed to block 638 (or, optionally, to block 634).

The exemplary method 650 of FIG. 6C, in the meantime, may proceed from block 656 to block 658, at which, the device 602 may compute a secondary value. The secondary value may be generated from the value of the nonce received at block 652 and the value V. In one non-limiting example, the secondary value may be a concatenation of the nonce and the value V. In some embodiments, the secondary value may additionally include some other information, such as, for example, current date and time, time spent by the device 602 on processing the request, and/or other values.

In some embodiments, the secondary value may be signed and/or encrypted with the private key 604 of the device 602. The signing or encryption at the device 602 may be performed, for example, by the optional crypto engine 608 or by a processor (or a computation module) of the device 602 (not shown). At block 660, the device 602 may send the secondary value to the terminal 610. If the secondary value is signed or encrypted by the device 602, the secondary value may be sent with the signature or in its encrypted form.

It should be noted that while operations within block 658 may take a significant amount of time (for example, on the order of 0.01 to 0.1 second), it does not affect $T_{th}$, which may be limited only by the speed of block 654.

Referring back to the exemplary method 620 in FIG. 6B, if at block 630, it is determined that the verification value is received within the predefined time threshold $T_{th}$, the method 620 may proceed to block 631, at which the terminal 610 may receive the secondary value. Then, at block 632, the terminal 610 may process the verification value and the secondary value by performing the exemplary processes shown in blocks 642, 644 and 646. For example, at block 642, using a public key of the device 602 (e.g., the public key corresponding the optional private key 604), the terminal 610 may verify the signature of (or decrypt) the received secondary value. At block 644, the value of the nonce sent to the device 602 may be compared to the value of the nonce received as part of the secondary value from the device 602. At block 646, the terminal 610 may verify the secondary value, for example, by comparing the value V received at block 628 to the value V received as a part of the secondary value received at block 631.

If all the checks in blocks 642-646 are successful, at block 633 the validation may be determined to be successful and the method 620 may proceed to block 636, at which the method 620 may determine that the relay attack detection has passed with no relay attack has been detected. If either the time check at block 630 or the validation determination at block 663 fails (for example, because of failing of any one of the checks at blocks 642-646), the method 620 may proceed to block 638 (or optionally block 634), at which the method 620 may determine that a relay attack has been detected.

Passing the relay attack detection at block 636 may be interpreted as "the owner of the private key that corresponds to the public key used in block 631 is on the other end of the communication link established in block 622, and no relay attack on the channel has been detected." In some embodiments, if the communication between the two communicating partners is through a protected channel (such as SSL/TLS connection(s) over the communication link), the method 620 may provide strong relay attack detection and authentication assurances.

Those with skill in the art understand that, in some embodiments, components necessary for the method 620 may be implemented by the device 602 and the device 602 may initiate the method 620 to ensure that no relay attack is mounted against the link 130 with the terminal 610, too. In those embodiments, the terminal 610 may also implement the necessary components of the device 602 for the method 650. In certain embodiments, the same methods 620 and 650 may be performed by both sides of a communication link for mutual detection of relay attacks.

It should further be noted that, when signature of the secondary value is used, in some embodiments the signature may be implemented by encrypting the whole or a part of the secondary value by the private key of the device 602; in this case the signature verification may be implemented as decryption using a public key that corresponds to the private key of the device 602.

In some embodiments, a method based on combining the method 600 with reporting the time $T_d$ spent by the device 602 on message processing may be used. The time period $T_d$ may represent the duration (expressed, for example, in terms of microseconds) of time from when the nonce is received till when the verification value V is sent. For example, in one embodiment, $T_d$ may represent the duration of time from when the last bit of the nonce is received till when the first bit of the verification value V is sent. For example, in one of such embodiments, the terminal 610 may determine the threshold $T_{th}$ in the software that sends the request and receives the response (for example, within a process or software application executed by a computer processor running on the terminal 610). The time $T_d$ may be measured at the device 602 by the software that receives the request and sends back the response (for example, by a process or a software application executed by a computer processor running on the device 602). In some of such embodiments, $T_{th}$ may be alternatively calculated, for example, as $T_{th}=T_d+T_{term}+T_{dev}$, where $T_d$ may be received from the device 602 (for example, calculated at the application level as the time between receiving a request and sending a response in software), $T_{term}$ may represent typical (or maximum) time delays at the terminal 610, and $T_{dev}$ may represent typical (or maximum) unaccounted time delays (outside of interval $T_d$) at the device 602. In some embodiments, $T_{dev}$ may depend on the type of the device 602. For example, the terminal 610 may have (or have access to) a database storing $T_{dev}$ (DBT, not shown) for each of known type of the device 602. The type of the device 602 may be derived, for example, from a public key of the device 602. In one non-limiting example, the terminal 610 may search a database of public keys (DBK, not shown) and locate the type of the device 602 based on the public key of the device 602. Alternatively, the device 602 may send its type to the terminal 610, for example, as an additional field in the secondary value, which may be signed by the private key of device 602. In some embodiments, instead of using the databases DBT and/or DBK, the terminal 610 may send a request to a server (not shown) to obtain necessary information.

In one non-limiting exemplary embodiment, the terminal 610 may be a POS terminal, and the device 602 may be a payment device such as a contactless smartcard or an NFC-enabled phone. The terminal 610 may send to and receive from the device 602 usual smartcard Application Protocol Data Unit (APDU) requests/responses. At least some of the usual requests/responses may include authentication data, such as a digital signature or message authentication code (MAC) generated by the device 602. A special APDU request/response may be added after one or more of such usual APDU requests/responses. The response in this special APDU request/response may include the time $T_d$ for a previous usual APDU request/response. In some embodiments, the time $T_d$ may be signed or may have an associated MAC generated by the device 602. Moreover, in some embodiments, the signature or the associated MAC may be generated using a unique identifier of the previous usual APDU request.

In some embodiments, it may be necessary to include the unique identifier of the previous usual request into signature/MAC calculation to avoid replay attacks in which an attacker may try to use a previously recorded special APDU with $T_d$ associated with a different APDU request/response. It should be understood that in such embodiments all requests may be unique. To achieve this, each APDU request, in addition to other data, may, for example, have a nonce as one of its fields. The unique identifier may be, for example, a hash value of the request, or the nonce.

The time $T_d$ may be included into APDU responses in a number of ways. For example, in some cases $T_d$ for a preceding APDU may be included into a subsequent response of a special APDU request/response. Alternatively, a usual APDU request/response may be extended to contain $T_d$ for the previous APDU request/response pair. In another alternative, an APDU response may include an estimate of timing for itself as an upper-bound estimate by the device 602, and the device 602 may wait until the estimated time elapses (at application level) before sending the APDU response.

In some embodiments, the terminal 610 may set $T_{th}$, for example, between $T_d+10$ ms and $T_d+50$ ms, with the number of retransmission attempts (similar to that of a block 634)

limited to a number from 3 to 5. In any case, similar to the method 600 above, the terminal 610 may deny payment if $T_{th}$ is exceeded.

In yet another embodiment, based on method 600 described above, two special APDU request/response pairs may be used. In the request of the first special APDU request/response pair the terminal 610 may send a nonce, and in the response of the first special APDU request/response pair the device 602 may send a verification value. The device 602 may measure the time $T_d$ spent on preparation of this response and include the measured $T_d$ in the response of the second special APDU request/response pair. In this embodiment, no modification to usual APDUs (such as adding nonces) is necessary.

In a yet another non-limiting exemplary embodiment, the terminal 610 may be a POS terminal, and device 602 may be a payment device such as a contactless smartcard or an NFC-enabled phone. To perform relay attack detection, a method, similar to method 620 described above, may be used as follows. The terminal 610 may send and receive usual smartcard APDU requests/responses, setting $T_{th}$, for example, to a fixed number depending on the nature of the APDU request. The $T_{th}$ may be set according to APDU commands, which may include some kind of signature (or MAC) generated by the device 602. In some embodiments, $T_{th}$ may be pre-set, for example, to a value between 100 and 300 ms for an APDU request that requires calculating a signature or MAC. In some embodiments, the device 602 may wait for a pre-defined time (for example, $T_{th}-50$ ms to $T_{th}-10$ ms) before sending such APDU responses. Waiting by the device 602 for a pre-defined time may ensure that processing of all requests take roughly the same time regardless of computational capabilities of the device 602. In such embodiments, if the terminal 610 receives the response before the pre-defined time, it may indicate that the device 602 does not wait as expected, and therefore may be compromised and correspondingly, the terminal 610 may refuse further communication.

In yet another embodiment, $T_{th}$ may be a function of the device type of the device 602. The terminal 10 may determine the type of the device 602 as described above, for example, by receiving it from the device 602 or looking up the type information in some external database based on a public key of the device 602. Based on the device type, for example, $T_{th}$ may be set to lower values for faster-performing devices and to higher values for slower-performing devices. In some other embodiments, $T_{th}$ may be a function of both the type of the device 602 and the nature of the command. Again, as an additional protective measure, if the terminal 610 receives the response faster than expected for such a device and/or command, the device 602 or the communication channel may be deemed compromised, and the terminal 610 may terminate communication.

It should be noted that other processes of relay attack detection may be used in place of or in addition to the methods described above. For example, exemplary processes for establishing proximity may include those described in U.S. Provisional Patent Application 61/825,376, filed May 20, 2013, entitled "Systems, Methods and Apparatuses for Ensuring Proximity of Communication Device" (the '376 application), the entirely of which is incorporated by reference.

Embodiments of the present disclosure may implement one or more of the relay attack detection methods described above. For example, in some embodiments, the terminal 110 (hereinafter may refer to any of the terminals 110, 210, 310, 410, 510 and 610) and the device 102 (hereinafter may refer to any of the devices 102, 202, 302, 402, 502 and 602) may implement one or more of the tests described above. In addition, the terminal 110 and the device 102 may implement other relay attack detection methods, for example, based on methods described in the '376 application. Moreover, other methods, such as precise position determining (such as GPS) may also be implemented by either or both the terminal 110 and the device 102. In some other embodiments, while the terminal 110 may implement a wide variety of tests to assure absence of relay attacks, the device 102 may support only a subset of these tests or a different set of tests. It should be noted that support by the device 102 may mean that the device 102 implements a method corresponding to the relay attack detection method implemented at the terminal 110. For example, if the terminal 110 implements the method 620, the device 102 may support this method if it implements the corresponding method 650.

Figure 7:
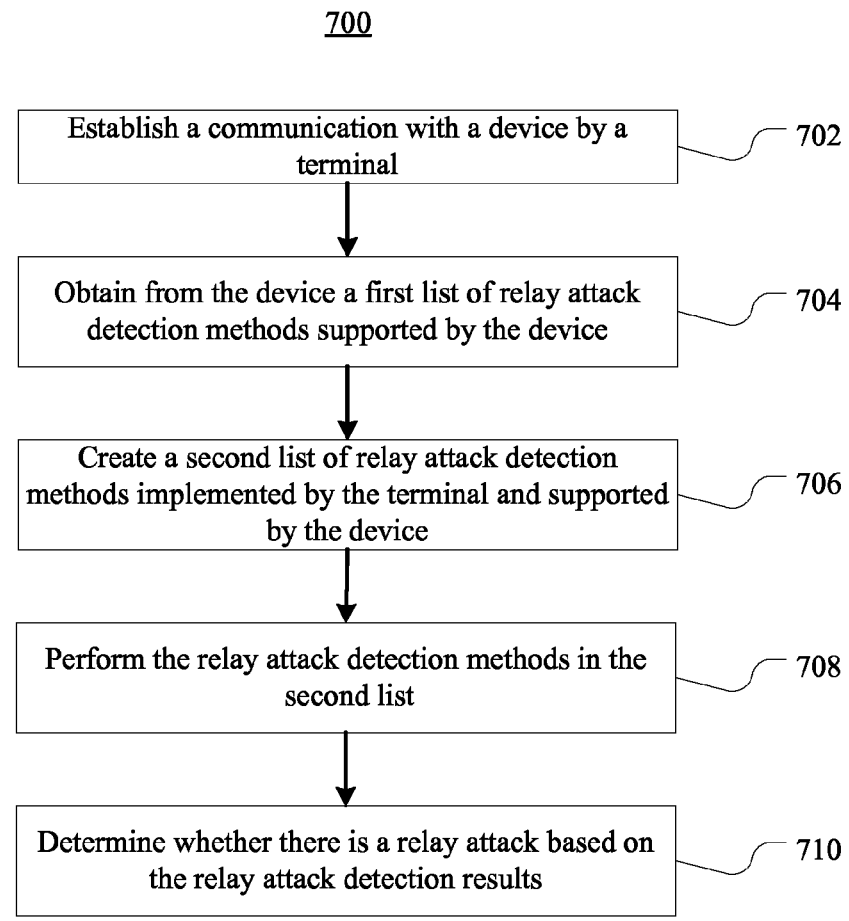
FIG. 7 is a flow diagram of another exemplary method according to the present disclosure.

FIG. 7 shows an exemplary method 700 according to one embodiment of the present disclosure. The method 700 may start at block 702, at which a terminal 110 may establish a communication link 130 with a device 602 to communicate data between the device and the terminal. As described above, the details of establishing such a data connection may depend on the particular type of communication link 130 used in a particular implementation and an optional logical channel over the communication link 130 may be established.

At block 704, the terminal 110 may obtain from the device 102 a first list of relay attack detection methods supported by the device 102. For example, the device 102 may support one or more of the relay attack detection methods that may be implemented at the terminal 110 as described above but not all of them. At block 706, the terminal 110 may create a second list of relay attack detection methods that are both implemented by the terminal 110 and supported by the device 102. For example, the terminal 110 may maintain a complete list of relay attack detection methods implemented by the terminal 110. Upon receipt of the first list of relay attack detection methods received from the device 102, the terminal 110 may determine which one of complete list of the relay attack detection methods implemented by the terminal 110 is also supported by the device 102. Thus, the second list of the relay attack detection methods may include all relay attack detection methods that are implemented by the terminal 110 and supported by the device 102.

In some embodiments, the relay attack detection methods may be weighted. For example, each relay attack detection method may be assigned a weight such that methods of greater precision and/or reliability may have greater weight than methods with lower precision and/or reliability. For example, the relay attack detection method 620 and its corresponding method 650 may be more precise than the relay attack detection method 220 and its corresponding method 240. If the relay attack detection methods are weighted, in some such embodiments, the second list of relay attack detection methods may be optionally filtered. For example, if there are both low-weight and high-weight methods on the list, some or all low-weight methods may be filtered out in some embodiments.

At block 708, the terminal 110 may perform the relay attack detection methods in the second list. The methods may be performed sequentially, in parallel, or a combination of these two approaches. In some embodiments, if the second list of methods are filtered, then only those left may be performed. At block 710, the terminal 110 may determine whether there is a relay attack based on the relay attack detection results. For example, if there is a potential relay attack ongoing, the results of the tests performed in block 708 may indicate an unreasonable delay in the link 130.

In one embodiment, if more than one relay attack detection method have been performed at block 708 and at least one method indicates a potential relay attack, the terminal 110 may determine that the communication link 130 between the terminal 110 and the device 102 is under a relay attack.

In another embodiment, according to the weights assigned to relay attack detection methods, a final determination at block 710 may be based on the results of methods with greater weights while discarding results of less reliable or precise methods. In yet another embodiment, a final determination at block 710 may be based on a relay attack detection method with the greatest weight only.

In yet another embodiment, a final determination at block 710 may depend on whether the total weight of passed relay attack detection methods reaches a pre-defined total weight threshold. That is, if only a few low-weight tests indicate that no relay attack is mounted against link 130, a final determination at block 710 may still deem that there may be a relay attack on the link 130 even in absence of any relay attack detection result indicating there is a relay attack.

In some embodiments, two possible weights may be assigned to each of the relay attack detection methods performed at block 708—one weight for successfully completed relay attack detections in which no attack is detected, and another weight for relay attack detections indicating that an attack may be in progress. These weights may be, for example, added independently for all relay attack detection methods performed and compared to two separate pre-defined thresholds to determine the overall output of the relay attack detection. In some embodiments, these weights may be added together and compared to a single threshold. In some other embodiments, for example, weights for "no relay attack detected" outcomes may be positive, and weights for "relay attack detected" outcomes may be negative, and all weights may be added together and compared with a single threshold to determine the overall outcome of the relay attack detection.

In some embodiments, each relay attack detection test itself may generate weights for the test result. For example, a value of minus one ("−1") may mean "attack is certainly ongoing," a value of plus one ("+1") may mean "attack is proven impossible", and a value of zero ("0") may mean "no information about attack has been extracted." These weights may be used in addition to or instead of weights assigned to relay attack detection methods as described above.

There are a variety of ways to assign weights to the relay attack detection methods according to the present disclosure. For example, in some embodiments, the device 102 may support two methods: 240 and 650. To continue the example, the terminal 110 may be configured such that failure of the method 240 has an assigned weight of −1000, success of the method 240 has an assigned weight of 100, failure of the method 650 has an assigned weight of −10000, and success of the method 650 has an assigned weight of 500. In this example, the threshold may be set at zero, and thus if the sum of weights is greater than zero, the overall outcome of the relay attack detection may be "no relay attack detected." Accordingly, if both methods 240 and 650 succeed, the overall outcome of the relay attack detection is "no relay attack detected" because 100+500 is larger than zero. If the method 650 succeeds, and the method 240 fails, the overall outcome of the relay attack detection may be "relay attack detected" because −1000+500=−500, which is less than zero. Similarly, if the method 240 succeeds and the method 650 fails, the overall outcome of the relay attack detection may be "relay attack detected" because 100+(−10000)=−9900, which is less than zero. If both methods fail, the overall outcome of the relay attack detection may also be "relay attack detected" because −1000+(−10000)=−11000, which is less than zero.

In some other embodiments, weights for different outcomes of the method 240 may be assigned as follows. If the lists of the WiFi terminals from which the signal may be received by the terminal 110 and the device 102, respectively, fully match, the outcome of the method 240 may be assigned a weight of 100. If the lists of the WiFi terminals diverge for at most 10%, that is, for example, only a single entry out of 10 could not be matched, the weight is 0. If the lists diverge for at most 20%, that is, for example, at most two entries out of 10 could not be matched, the weight is −200. And, if the divergence is more than 20%, the weight is −1000. Weights for the method 650 may also be assigned as described above. Then, if the method 650 succeeds, and lists of the method 240 diverge for 20% or less, the overall outcome of the relay attack detection may be "no relay attack detected" because 500+(−200), which is larger than zero, and −200 is the lowest possible weight in this case. If the lists diverge for more than 20%, the overall outcome of the relay attack detection may be "relay attack detected" because 500+(−600) is less than zero. The weights assignments described herein are merely exemplary and other weight assignments may be implemented in addition to or in place of these exemplary weight assignments.

It should be understood that any methods or blocks discussed above to be implemented by the terminal 110 may be implemented by the device 102. Also, any methods or blocks discussed to be implemented by the device 102 may be implemented by the terminal 110. In some of such embodiments, the device 102 may make a decision of whether a relay attack is mounted against the communication link 130.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each imaged apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, a DVD or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. An apparatus for preventing relay attacks on a communication link between the apparatus and a communication partner, comprising:
    a communication port;
    a timer; and
    a processor device configured to:
        generate a request having two data segments;
        transmit a first data segment in the request through a first communication link using the communication port and start counting a first time period using the timer;
        transmit a second data segment in the request through a separate second communication link using the communication port and start counting a second time period using the timer;
        receive a first response via the first communication link and stop the timer for the first time period;
        receive a second response via the second communication link and stop the timer for the second time period;
        receive authentication data via the communication port;
        authenticate the authentication data;
        compare a time difference between the first time period and the second time period with a predefined threshold;
        compare a first data field within the request with a second data field within the first response and compare a third data field within the request with a fourth data field within the second response; and
        determine whether there is a relay attack based on a comparison of the time difference, a comparison of the first data field with the second data field and a comparison of the third data field with the fourth data field.

2. The apparatus of claim 1, wherein the communication port is a wireless communication port.

3. The apparatus of claim 2, wherein the communication port is a Near-Field Communication port.

4. The apparatus of claim 2, wherein the request is a smartcard Application Protocol Data Unit (APDU) request and the response is a smartcard APDU response.

5. The apparatus of claim 4, wherein the predefined threshold is less than or equal to 5 milliseconds.

6. The apparatus of claim 5, wherein the communication port is a Near-Field Communication port.

7. The apparatus of claim 6, wherein one subsequent APDU response contains a time period $T_d$ representing a time period from a previous APDU request being received at the apparatus to a previous APDU response being sent from the apparatus.

8. The apparatus of claim 6, wherein the authentication data is a digital signature.

9. The apparatus of claim 6, wherein the authentication data is a message authentication code (MAC).

10. The apparatus of claim 7, wherein the authentication data is generated using a unique identifier of the previous APDU request.

11. The apparatus of claim 1, wherein the request is a smartcard Application Protocol Data Unit (APDU) request and the response is a smartcard APDU response.

12. The apparatus of claim 11, wherein one subsequent APDU response contains a time period $T_d$ representing a time period from a previous APDU request being received at the apparatus to a previous APDU response being sent from the apparatus.

13. The apparatus of claim 12, wherein the authentication data is generated using a unique identifier of the previous APDU request.

14. The apparatus of claim 1, wherein the authentication data is a message authentication code (MAC).

15. The apparatus of claim 1, wherein the authentication data is a digital signature.

16. The apparatus of claim 1, wherein the processor is further configured to generate a nonce and include the nonce in the request, and the first data field and the second data field to be compared contain the nonce.

17. The apparatus of claim 1, wherein the predefined threshold is less than or equal to 5 milliseconds.

18. The apparatus of claim 1, wherein the first data field and the third data field are the same.

19. A method for an apparatus to prevent relay attacks on a communication link between the apparatus and a communication partner, comprising:
    generating a request having two data segments at the apparatus;
    transmitting a first data segment in the request through a first communication link using a communication port of the apparatus and start counting a first time period using a timer of the apparatus;
    transmitting a second data segment in the request through a separate second communication link using the communication port and start counting a second time period using the timer;
    receiving a first response via the first communication link and stop the timer for the first time period;
    receiving a second response via the second communication link and stop the timer for the second time period;
    receiving authentication data via the communication port;
    authenticating the authentication data;
    comparing a time difference between the first time period and the second time period with a predefined threshold;
    comparing a first data field within the request with a second data field within the first response and comparing a third data field within the request with a fourth data field within the second response; and
    determining whether there is a relay attack based on a comparison of the time difference, a comparison of the first data field and the second data field and a comparison of the third data field and the fourth data field.

20. The method of claim 19, wherein the communication link is at least in part based on wireless link.

21. The method of claim 20, wherein the communication link is at least in part based on Near-Field Communication.

22. The method of claim 20, wherein the request is a smartcard Application Protocol Data Unit (APDU) request and the response is a smartcard APDU response.

23. The method of claim 22, wherein the predefined threshold is less than or equal to 5 milliseconds.

24. The method of claim 23, wherein the communication link is at least in part based on Near-Field Communication.

25. The method of claim 24, wherein one subsequent APDU response contains a time period $T_d$ representing a time period from a previous APDU request being received at the apparatus to a previous APDU response being sent from the apparatus.

26. The method of claim 24, wherein the authentication data is a digital signature.

27. The method of claim 24, wherein the authentication data is a message authentication code (MAC).

28. The method of claim 25, wherein the authentication data is generated using a unique identifier of the previous APDU request.

29. The method of claim 19, wherein the request is a smartcard Application Protocol Data Unit (APDU) request and the response is a smartcard APDU response.

30. The method of claim 29, wherein one subsequent APDU response contains a time period $T_d$ representing a time period from a previous APDU request being received at the apparatus to a previous APDU response being sent from the apparatus.

31. The method of claim 30, wherein the authentication data is generated using a unique identifier of the previous APDU request.

32. The method of claim 19, wherein the authentication data is a message authentication code (MAC).

33. The method of claim 19, wherein the authentication data is a digital signature.

34. The method of claim 18, further comprising generating a nonce and including the nonce in the request, wherein the first data field and the second data field to be compared contain the nonce.

35. The method of claim 19, wherein the predefined threshold is less than or equal to 5 milliseconds.

36. The method of claim 19, wherein the first data field and the third data field are the same.

* * * * *